United States Patent [19]

Brode et al.

[11] 3,897,497

[45] July 29, 1975

[54] POLYAMIDE-IMIDES

[75] Inventors: George Lewis Brode, Somerville; James Hajime Kawakami, Piscataway, both of N.J.

[73] Assignee: Union Carbide Corporation, New York, N.Y.

[22] Filed: Apr. 1, 1974

[21] Appl. No.: 456,805

Related U.S. Application Data

[60] Division of Ser. No. 182,526, Sept. 21, 1971, Pat. No. 3,817,921, which is a continuation-in-part of Ser. No. 50,968, June 29, 1970, abandoned.

[52] U.S. Cl. .......... 260/571; 117/161 P; 260/570 R
[51] Int. Cl. ............................................. C07c 93/06
[58] Field of Search ....................................... 260/571

[56] References Cited

UNITED STATES PATENTS

| | | | |
|---|---|---|---|
| 3,251,881 | 5/1966 | Susi et al. | 260/571 X |
| 3,514,415 | 5/1970 | Karol | 260/571 X |
| 3,609,190 | 9/1971 | Kuhlman | 260/571 X |

*Primary Examiner*—Paul F. Shaver
*Attorney, Agent, or Firm*—B. F. Crowe

[57] ABSTRACT

A series of polyamide-imides which are both tractable and soluble in polar solvents as well as stable at high temperatures has been prepared by the condensation polymerization of aromatic diamines or oligomers containing oxygen, sulfone, and optionally alkylidene linkages with trimellitic acid, trimellitic acid anhydride or trimellitic anhydride acid chloride.

4 Claims, No Drawings

POLYAMIDE-IMIDES

This is a division of Ser. No. 182,526 filed Sept. 21, 1971, now U.S. Pat. No. 3,817,921, which is in turn a continuation-in-part of Ser. No. 50,968 filed June 29, 1970, now abandoned.

BACKGROUND OF THE INVENTION

This invention relates to novel aromatic diamines and more particularly to aromatic polyamide-imides synthesized therefrom by condensation polymerization with trimellitic acid anhydride or trimellitic anhydride acid chloride or trimellitic acid.

The need for high polymeric coating materials which exhibit good high temperature stability has been partially satisfied by the synthesis of aromatic polyimides by the condensation polymerization of arylene diamines with aromatic dianhydrides. For example, polyimides prepared in one instance from phenylenediamine and pyromellitic dianhydride having repeating units are presented by the formula

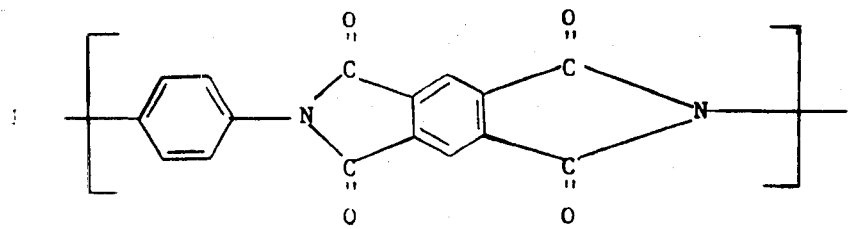

have been recommended for use as wire coatings. While such compounds fulfill the demands for high temperature stability, they were deficient in other properties such as adhesion, elongation, ease of drying, solubility in organic solvents, and tractability or flow at application temperature. Some of these difficulties were overcome by either changing the imide linkages to amide linkages or to amide-imide linkages or by replacing the arylene moiety of the diamine with polynuclear entities such as:

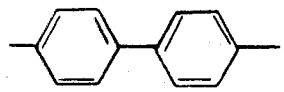 or 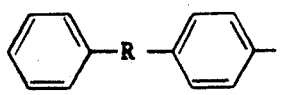

where R is alkylidene —O—, —S—,

and the like.

As so often happens in custom making high polymers to improve a particular property, the desired end is achieved only by the loss of one or more of the other properties. Thus for example, the substitution of amide linkages for imide linkages in polymers made from simple aromatic diamines improves tractability but renders the polymer less thermally and oxidatively stable, (J. I. Jones et al., Chemistry and Industry, 1686, Sept. 22, 1962). The polymers of this invention overcome the difficulties associated with polyimides and at the same time are useful in a wider range of applications than can be considered for any previously available high temperature polymer.

SUMMARY OF THE INVENTION

It has now been found that novel high temperature resistant, normally solid, polyamide-imides which have excellent physical and chemical properties can be synthesized having repeating units represented by the formula:

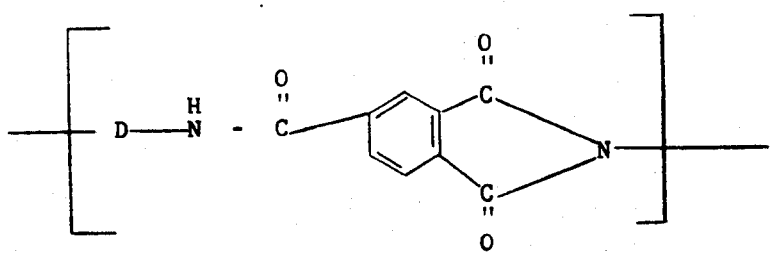

wherein D is a residue remaining after removal of both amine groups from at least one diamine having the formula:

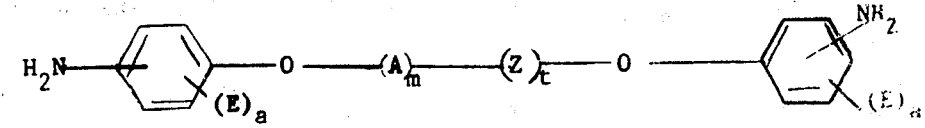

wherein A is a divalent radical selected from the group consisting of:

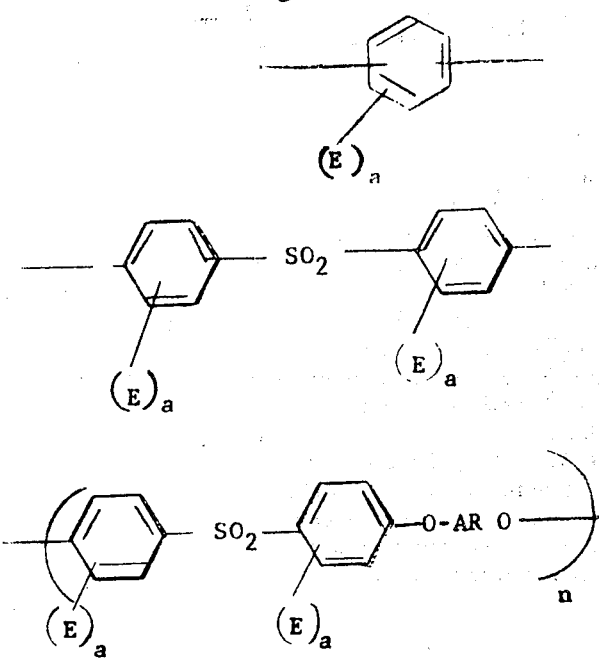

Z is a divalent radical selected from the group consisting of

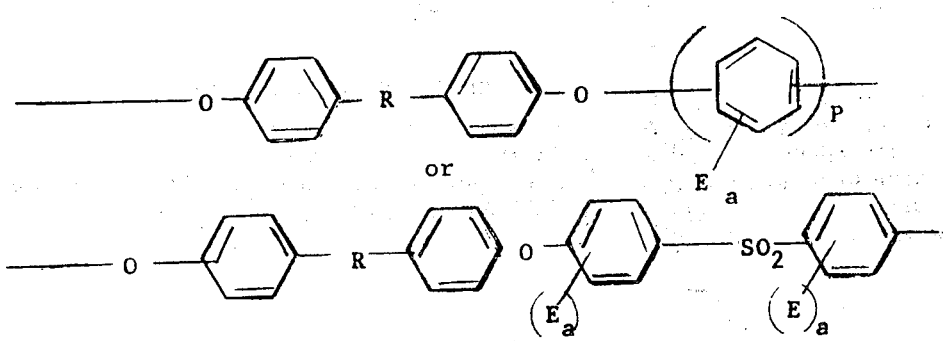

and wherein:
  m and p are integers having values of 0 to 4
  t is an integer having values of 0 to 5 with the proviso that m and t cannot both be 0 at the same time
  E is a halogen including F, Cl, or Br
  each a is an integer having values of 0 to 4
  Ar is a divalent radical selected from the group consisting of

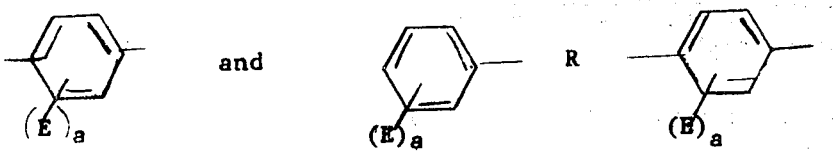

R is an alkylidene radical having 1 to 10 carbon atoms therein, and n is a rational number having values of 0 to about 25.

DESCRIPTION OF THE INVENTION

These novel polyamide-imides can be prepared by first condensing a trimellitoyl halide such as trimellitic anhydride acid chloride and one of the diamines described above in a polar solvent such as dimethylacetamide to form a low molecular weight polyamic acid which upon treatment with an equivalent amount of an HCl scavenger, such as, anhydrous triethylamine rapidly increases in molecular weight to that of a high polymer. This reaction is illustrated below with trimellitoyl chloride and a sulfone ether diamine. The polyamic acid is then dehydrated in situ with a chemical dehydrating agent such as acetic anhydride to the polyamide-imide as shown below:

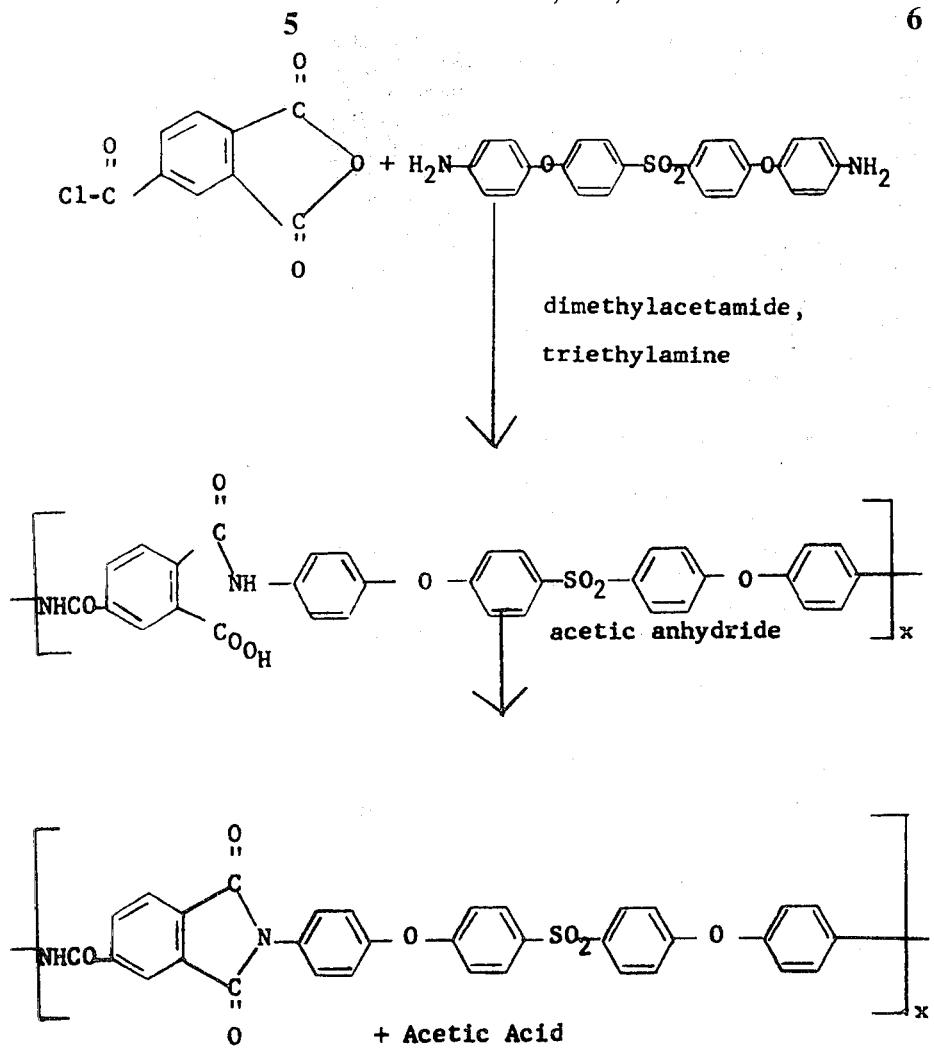

wherein $x$ is a number representing the degree of polymerization, and is sufficiently large so as to afford a normally solid high molecular weight polymer.

The temperature at which the diamine-trimellitic anhydride acid chloride reaction takes place to form the polyamic acid is preferably about −20° to +60°C. with about 0° to +20°C being particularly preferred.

The chemical conversion of polyamic acid to polyamide-imide which can be described as an imidization or dehydration step can be carried out in the temperature range of about −10° to 120°C. with a range of about 20° to 40°C. being preferred. Thermal imidization is also possible with and without the use of an azeotropic solvent to assist in the removal of water. Thermal imidization can be accomplished in the temperature range of about 50°–400°C., with a range of 100°–250°C. being preferred.

Chemical dehydrating agents which can be used for the conversion of the polyamic acids to polyamide-imides include but are not limited to aliphatic acid anhydrides, such as, acetic acid anhydride, propionic acid anhydride and the like; halogenated materials such as $POCl_3$, $SOCl_2$, and the like; molecular sieves, silica gel, phosphorous pentoxide, aluminum oxide and the like.

In the preparation of the polyamide-imides, pressure is not critical although it is preferred for economic reasons to employ atmospheric pressure. If desired however, subatmospheric as well as superatmospheric pressure can be used.

In preparing the polyamide-imides of this invention from trimellitic anhydride acid chloride it is preferred to use a specific order of addition as regards to the use of the HCl scavenging reagent. If the scavenger is added prior to the addition of trimellitoyl chloride the result is a lower molecular weight polyamide-imide. If the addition of the scavenger is delayed until after the polymerization reaction is substantially complete the result is a very slow polymerization rate because the solvent such as dimethylacetamide only partially complexes the hydrogen chloride formed during the polymerization process. It has been unexpectedly found that if the scavenger is added soon after the addition of the trimellitoyl chloride one gets the best results as manifested by the production of a high molecular weight polyamide-imide with relatively fast polymerization rates.

Suitable scavenging agents for the removal of hydrogen chloride include tertiary amines containing aliphatic substituents such as trimethylamine, triethylamine, tripropylamine, tributylamine, and the like. Other reagents which can be used include cyclic organic bases, such as, pyridine, lutidine, collidine, quinoline, and the like, inorganic bases such as alkali metal hydroxides, alkali metal carbonates, alkali metal acetates, alkaline earth oxide, alkaline earth hydroxides, alkaline earth carbonates, alkali earth acetates, and the like; and organic oxides such as ethylene oxide, propylene oxide, and the like.

The polar solvents, used for the preparation of the instant polyamide-imides are those having a solubility parameter, δ, of about 9.8 to 15 as defined by H. Burrell, Official Digest, pages 725–758, October 1955. Exemplary solvents include N,N-dialkyl carboxylic acid amides where the alkyls are lower alkyls, such as, dimethyl acetamide, dimethylformamide and the like, heterocycles, such as N-methylpyrrolidone, tetrahydrothiophene-1, 1-dioxide, and the like; organic sulfur oxides, such as, dimethyl sulfoxide, dimethyl sulfone, and the like; cyclic lactones such as γ-butyrolactone, and the like; and mixtures of the above enumerated solvents with liquid hydrocarbons having about 5 to 20 carbon atoms, such as, toluene, xylene, and ketone such as methylethyl ketone, cyclohexanone and the like.

Although the polyamide-imides can be recovered by stripping off the solvent system following the polymerization and imidization steps, it is preferred to employ a precipitation technique using a solvent or solvents which are miscible with the reaction mixture solvents but in which the polyamide-imides themselves are insoluble. Suitable precipitating solvents include aliphatic ketones, such as, acetone, methyl ethyl ketone, diethyl ketone, and the like; aliphatic alcohols such as methanol, ethanol, isopropanol, and the like; aliphatic esters such as methyl acetate, ethyl acetate, butyl acetate and the like; and water, hydrocarbons such as benzene, toluene.

Thermoplastic polyamide-imide can be conveniently recovered by vacuum stripping the solution by processing through a vented extruder.

The precipitation recovery method facilitates filtration of the polyamides-imides and their purification by washing on the filter. Drying the polyamide-imides at temperatures of up to about 200°C. effects removal of residual solvents in general.

An alternate preparation of these polyamide-imides consists in the direct condensation of the diamines with trimellitic acid anhydride instead of with the acid chloride followed by thermal dehydration or dehydration with an azeotropic solvent using a catalyst such as boric acid to produce a high molecular weight polyamide-imide. This series of reactions is delineated below:

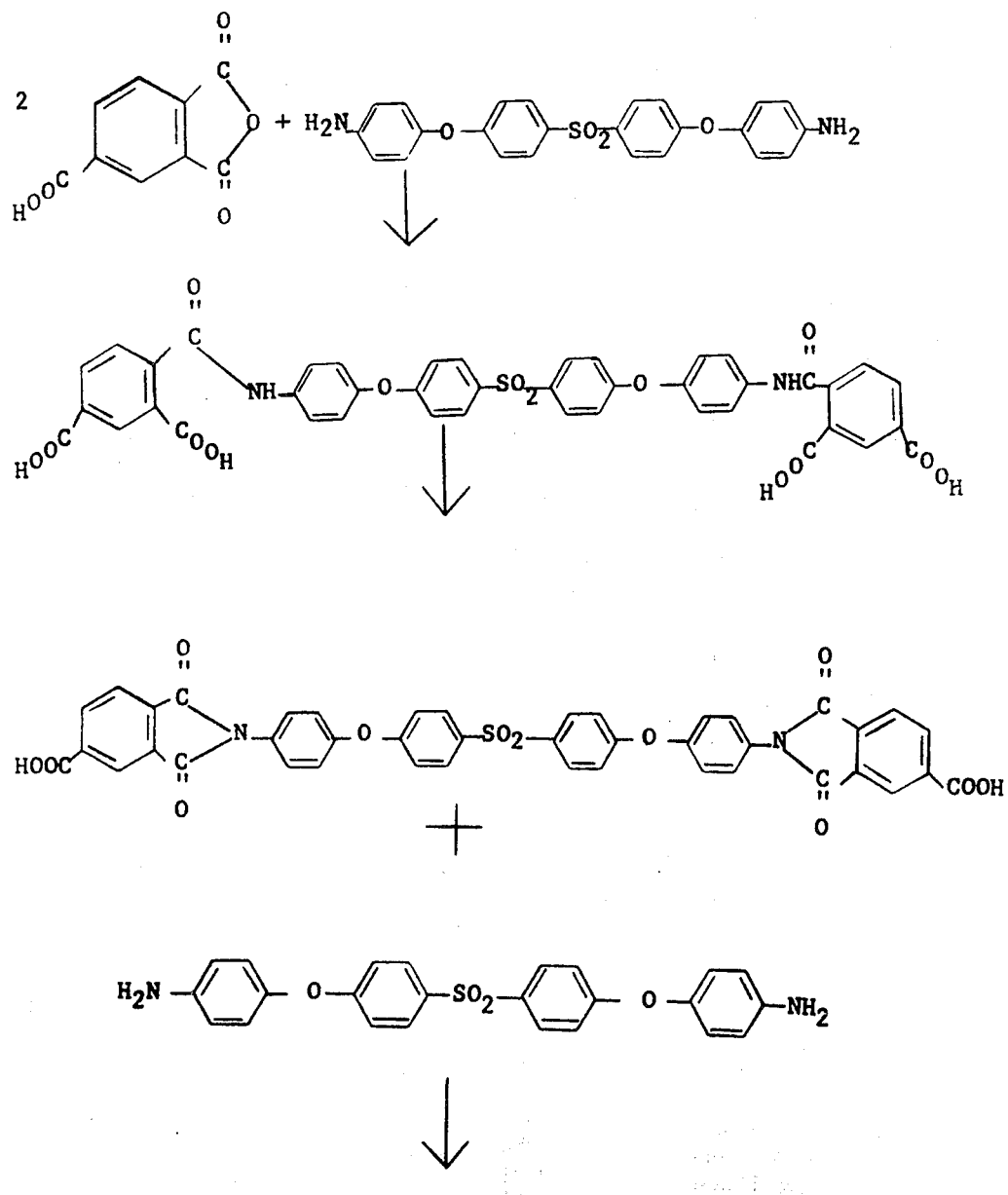

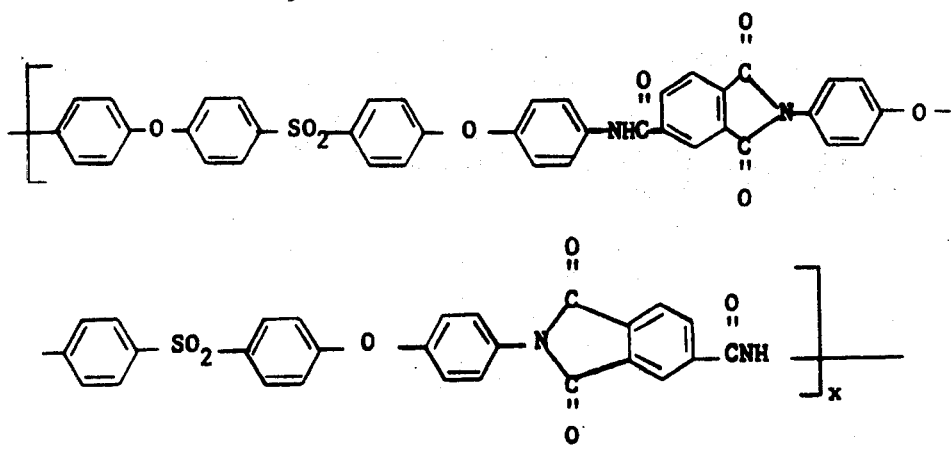

where $x$ is as defined previously.

Another alternate method of preparing those polyamide-imides consists in the condensation of the diamines described above with trimellitic acid in a manner similar to that described for the reaction with trimellitic acid anhydride above.

In these two alternate methods, where dehydration or imidization is effected thermally, a temperature range of about 100° to 300°C. can be used with a range of about 190° to 240°C. being preferred.

Another facet of this invention resides in the method of preparation of the above-described novel diamines by the condensation of the sodium salt of p-aminophenol: (1) with an equivalent amount of p-dichlorodiphenyl sulfone alone in one instance; (2) with an equimolar quantity of both p-dichlorodiphenyl sulfone and bisphenol-A[2,2-bis(p-hydroxyphenyl)-propane], plus a further amount of p-dichlorodiphenyl sulfone equivalent to the amount of the sodium salt of p-aminophenol used; and (3) with an equimolar quantity of both p-dichlorodiphenyl sulfone and hydroquinone plus an amount of p-dichlorodiphenyl sulfone equivalent to the amount of the sodium salt of p-aminophenol used.

These reactions are delineated in the equations below:

(1)

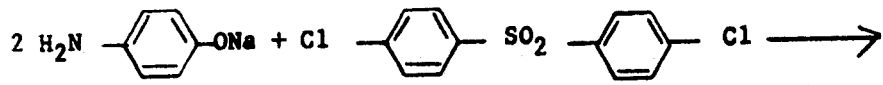

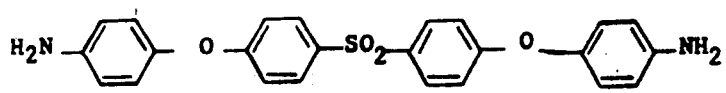

(2)

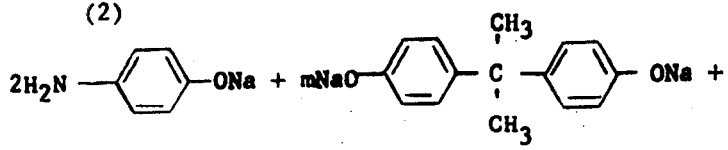

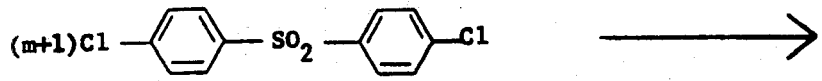

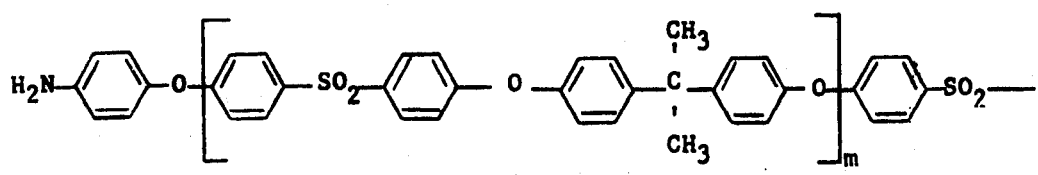

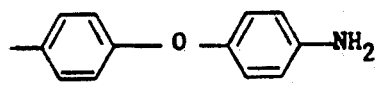

wherein *m* is a rational number having average product distribution values ranging from about 1 to about 25.

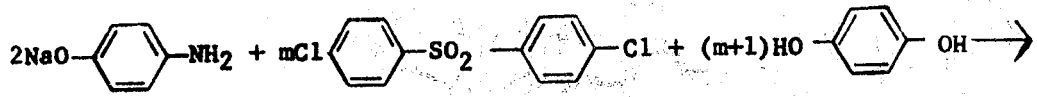

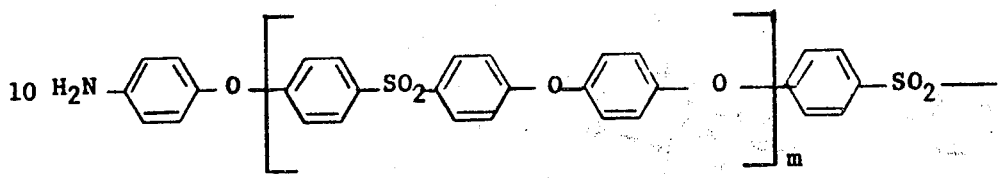

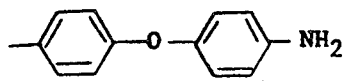

wherein *m* is as defined above.

The success of these syntheses was unexpected since the literature indicated that p-aminophenol decomposed very rapidly in the presence of small amounts of oxygen and that aniline ionizes to the extent of 10% with sodium hydroxide in anhydrous dimethyl sulfoxide bridge, as for example in the reaction of p-nitro sodium phenolate and dichlorodiphenol sulfone followed by hydrogenation, the dichlorodiphenyl sulfone contains traces of sulfides and other sulfur-containing poisons, because of the method of preparation of the sulfone, which destroy common hydrogenation catalysts required for the hydrogenation step. This sequence of reactions is delineated in the equation below:

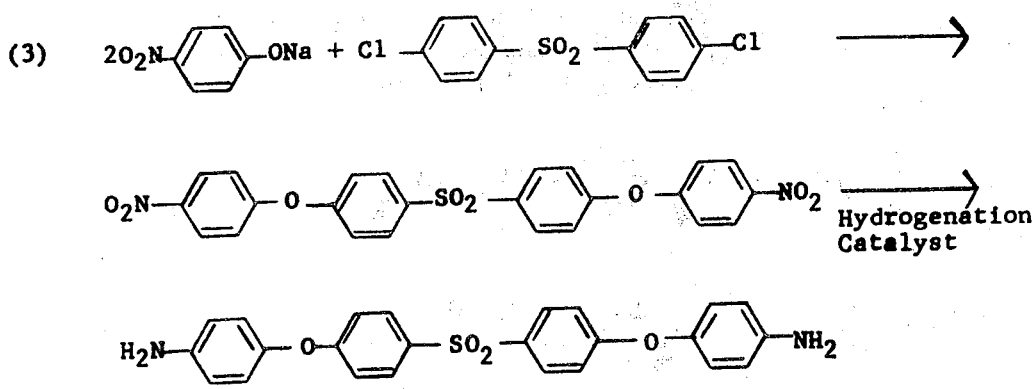

(cf. O. Dolman et al, Can. J. Chem., 45, 911, 1967 and R. Konaka et al, J. Am. Chem. Soc., 90, 1801, 1968). It was therefore surprising that the pure diamines could be obtained by this approach.

The more common or conventional technique for preparing aromatic diamines which involves the reaction of nitrophenol with a chloronitrobenzene to afford the corresponding dinitro compound whose nitro groups are subsequently reduced to amine groups is not as amenable to a commercial process becase first of all it involves an extra reaction step. Secondly, in the specific preparation of a diamine containing a sulfone Because of the unique combination of physical and chemical properties exhibited by the polyamide-imides of this invention, and particularly the unusual combination of tractability and high temperature stability, they are particularly useful for the fabrication of structural laminates and for the preparation of electric wire coatings, dielectric films, molded parts, and the like.

The importance of the order of the components in the repeating unit of the polyamide-imides of this invention is demonstrated by comparing on the one hand a polyamide-imide prepared by reaction of the ether sulfone oligomer diamine having the formula (A)

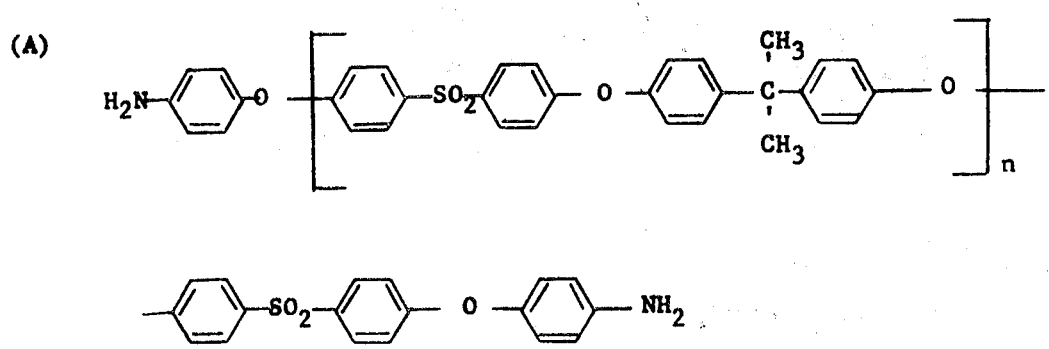

with trimellitoyl chloride and on the other hand a diamine oligomer disclosed in Belgian Pat. No. 711,729 having the formula contains an extra bisphenol-A unit, the polyamide-imide of the present invention having the formula (B)

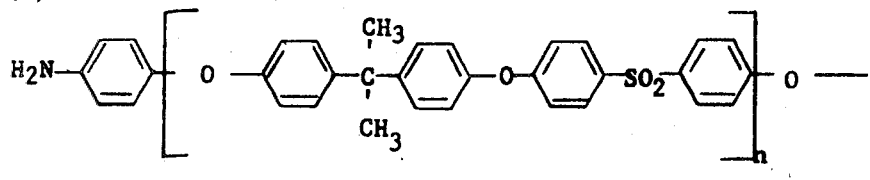

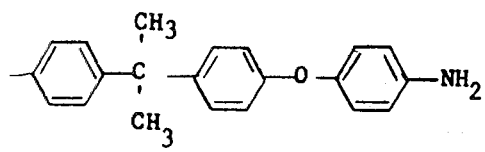

(D)

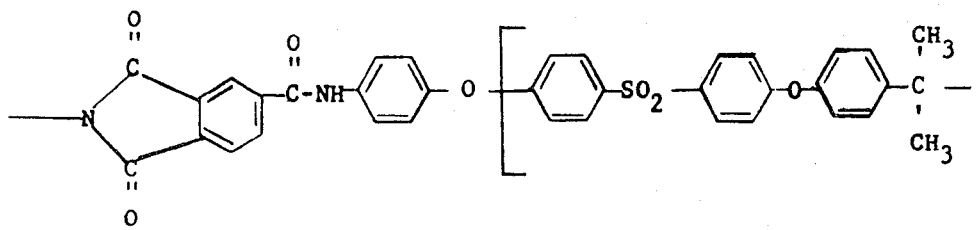

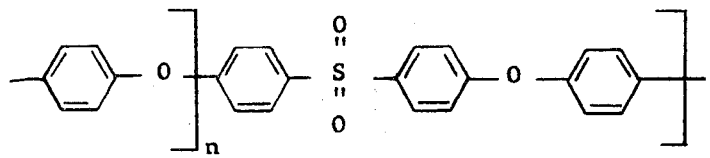

converted to a polyamide-imide with trimellitoyl chloride. Whereas a speculative, unknown polyamide-imide derived from the latter prior art diamine having the formula contains an extra diphenyl sulfone unit. It should be noted that Belg. Pat. No. 711,729 teaches a preparation of polyimides only not a preparation of polyamide-imides. This difference in molecular architecture af- (C)

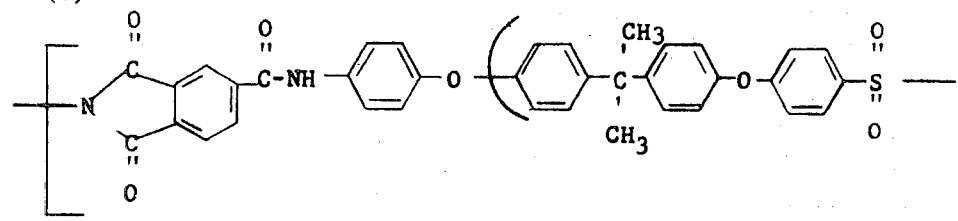

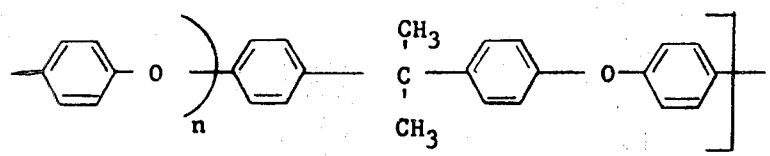

fords polyamide-imides made by the practice of this invention superior to those made from the diamines in the recited patent in the oxygen index flammability test (described in J. Fire & Flammability Vol. 1, pg. 36, 1970), thermal stability, solvent resistance and in having higher glass transition and heat distortion temperatures.

Where $n$ has an average value of 1 in formula (D) above, the $T_g$ for the claimed polyamide-imide is 220°C., the oxygen flammability index 36, the environmental stress aging solvent resistance good and the thermal stability good. In contrast the environmental stress aging solvent resistance of a polyamide-imide having the structure shown in formula (C) above is poor, the thermal stability fair, and the oxygen flammability index and $T_g$ calculated from the group contribution of bisphenol A moieties and bisphenyl sulfone moieties 32 and 198°C. respectively.

to the completely imidized form. On conversion to the completely imidized form, they become thermoset resins through crosslinking. This intelligence is dispensed in, for example, U.S. Pat. No. 3,428,486 issued to N. J. George on Feb. 18, 1969 as assignor to the P. D. George Company. In contrast the polyamide-imides of the claimed invention are not post-cured and are not crosslinked, that is, they are thermoplastic resins in the classical sense and are used as such without conversion to another form such as a thermoset resin. Unlike these prior art resins the claimed polyamide-imide can be softened and reworked by heating to elevated temperatures.

The methods described supra for the synthesis of the diamines used in the preparation of the polyamide-imides of this invention are equally applicable to the preparation of monoamines as well as higher polyamines. The novel amines thus made available may be delineated by the formula:

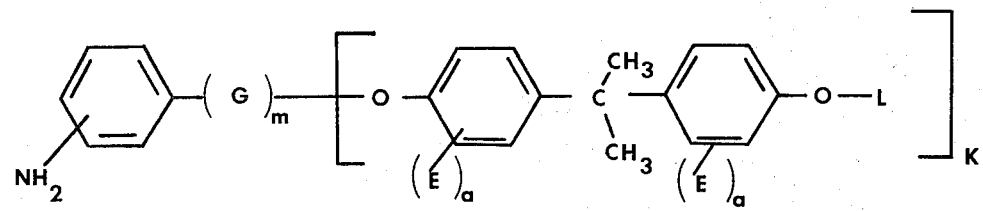

It should be borne in mind that some of the commercially available polyamide-imides extant are useful as coatings, laminates, adhesives, insulation and the like, only when converted through a post-curing operation Wherein G is a radical selected from the group consisting of:

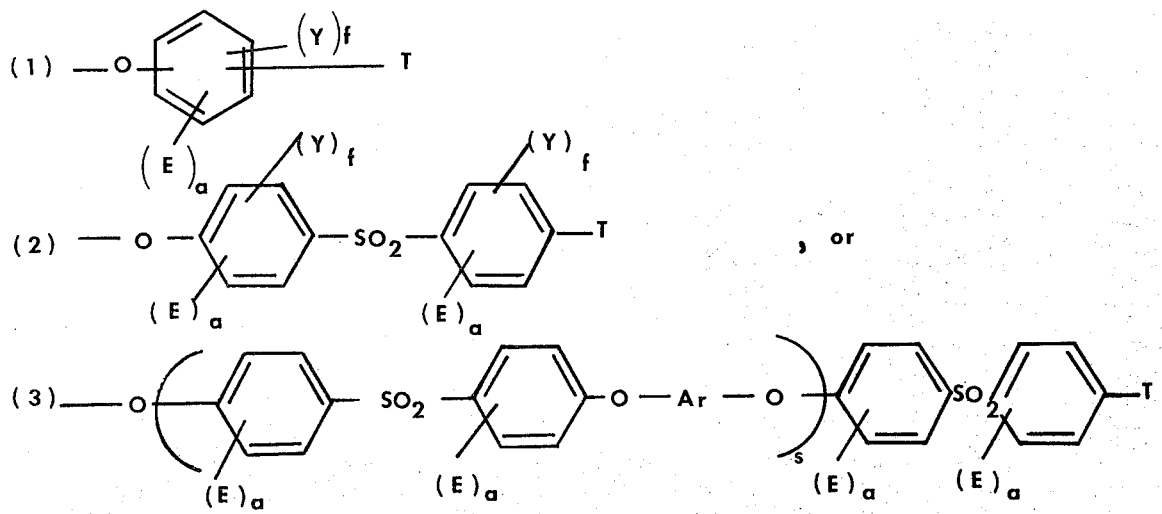

Wherein L is a radical selected from the group consisting of:

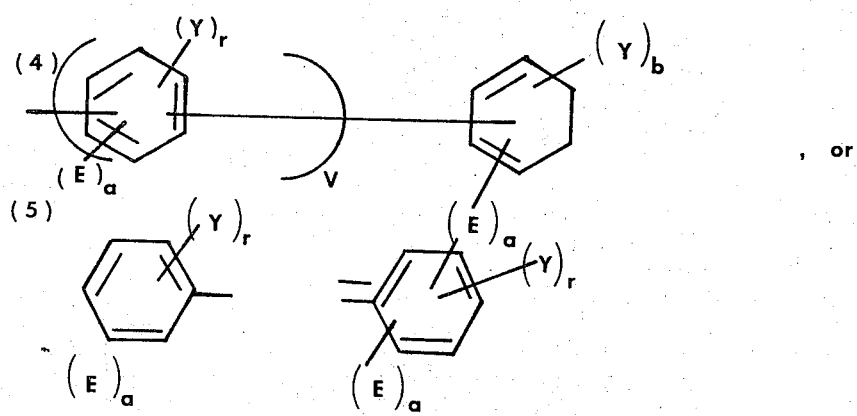

when $m = 0$

Wherein Y is a radical having the formula:

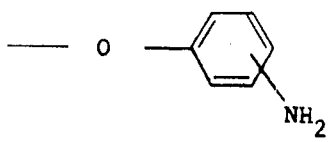

$m$, $v$, and $a$ are integers having values of 0 to 4, $r$, $b$ and $f$ are integers having values of 0 to 2 with, the proviso that the sum of a plus, $r$, $b$ or $f \not> 3$, $k$ is an integer having values of 0 to 1, T is selected from the group consisting of hydrogen, Cl or a valence bond with the proviso that T is hydrogen or Cl when $k=0$ and T is a valence bond when $k=1$, E is a halogen selected from the group consisting of F, Cl or Br, $s$ is a rational number having values of about 1 to about 25, and Ar is a divalent radical selected from the group consisting of

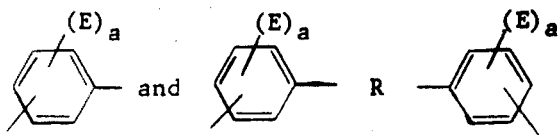

wherein R is an alkylidene moiety containing from 1 to about 10 carbon atoms.

The laboratory preparations of several specific amines are presented in the experimental section which follows. All of these amines can be utilized as intermediates for the preparation of useful polyamide-imides.

The invention is further described in the examples which follow. All parts and percentages are by weight unless otherwise specified.

EXAMPLE 1

Preparation of 4,4'-[sulfonylbis(p-phenyleneoxy)]dianiline

A 500 ml. round bottom, 3-necked flask fitted with a magnetic stirring bar, thermometer, additional funnel, and nitrogen inlet tube was charged with 21.82 grams (0.20 moles) of p-aminophenol and 100 ml. of oxygen free dimethyl sulfoxide. The resultant solution was stirred under nitrogen and then 15.93 grams of 50.22 per cent aqueous sodium hydroxide was added dropwise to the addition funnel. The contents of the funnel were mixed, rinsed with 1 ml. of oxygen free water into the reaction mixture. About 10 minutes was required for this addition period during which time the temperature rose from about 26° to 38°C. A Dean-Stark water trap and reflux condenser was attached to the reaction flask. The reaction mixture was heated to 160° over a two hour period while 150 ml. of chlorobenzene was added in portions to the reaction flask. Water was azeotroped from the reaction mixture until the chlorobenzene collected in the Dean-Stark trap was free of water. The reaction mixture was cooled to 135°C. and 28.72 grams (0.10 moles) of dichlorodiphenyl sulfone dissolved in 40 ml. of hot chlorobenzene was added rapidly to the reaction mixture. An exothermic reaction resulted increasing the reaction mixture temperature from 135° to 150°C. After stirring for an additional 45 minutes the temperature had increased to 160°C. The reaction mixture was maintained at a temperature of 160° for 3 hours after which it was allowed to cool overnight to room temperature. The cooled reaction mixture was poured into 500 ml. of water precipitating crude 4,4'-[sulfonylbis(4-phenyleneoxy)]dianiline as a solid. This material was filtered, dissolved in tetrahydrofuran, dried over magnesium sulfate and the solvent removed under vacuum to afford a yield of 87 per cent amounting to 37.6 grams having a melting point of 177°–187°C. Recrystallization of 0.21 grams of this product in 1 ml. of hot tetrahydrofuran and 1 ml. of isopropanol afforded a 0.15 gram (70 per cent) yield of the product having a melting point of 188°–191°C. Analysis by mass spectrograph showed a parent peak of 432 which matches the formula:

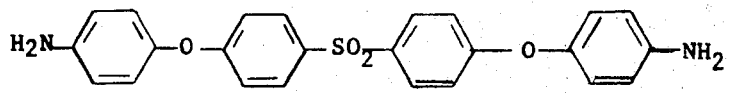

The identity of the 4,4'-[sulfonylbis(p-phenyleneoxy)]dianiline produced was further demonstrated by elemental analysis data shown below:

| Element | Calculated (%) | Found (%) |
|---------|----------------|-----------|
| C | 66.65 | 66.72 (66.49) |
| H | 4.6 | 5.00 (4.77) |
| N | 6.48 | 6.10 (6.77) |

EXAMPLE 2

Preparation of Oligomer Diamine from p-Aminophenol, bisphenol A and p-Dichlorodiphenyl Sulfone Into a 12 liter flask was charged 716.5 grams (3.14 moles) of bisphenol A, 687.5 grams (6.38 moles) p-aminophenol, 4.2 liters of dimethyl sulfoxide and 2.5 liters of toluene. After purging with nitrogen, 1003.8 grams (12.62 moles) of a 50.2% solution of sodium hydroxide was added and the pot temperature brought to 110°–120°C. The water was removed from the toluene azeotrope using a Barrett tube, after which the toluene was distilled off until the pot temperature reached 160°C. At this point, the reaction mixture was cooled to 110°C. and 1807.5 grams (6.28 moles) of dichlorodiphenyl sulfone added as a solid. The pot was reheated to 160°C. for one hour and then cooled. At 150°C. a solution of sodium p-aminophenolate, prepared by dehydrating a mixture of 10.9 grams (0.1 mole) p-aminophenol, 8.0 grams (0.1 mole) of a 50% sodium hydroxide solution, 30 ml. of dimethyl sulfoxide and 20 ml of toluene, was added.

After cooling to room temperature, the solution was filtered to remove sodium chloride and coagulated in a blender from 2% sodium hydroxide solution containing 1% sodium sulfite. The precipitated diamine was washed with a hot 1% solution of sodium sulfite and methanol and dried in a vacuum oven at 80°C.

The yield of diamine was 2655 grams (96.5%) and the equivalent weight was 456 grams.

This oligomer diamine has the formula shown below:

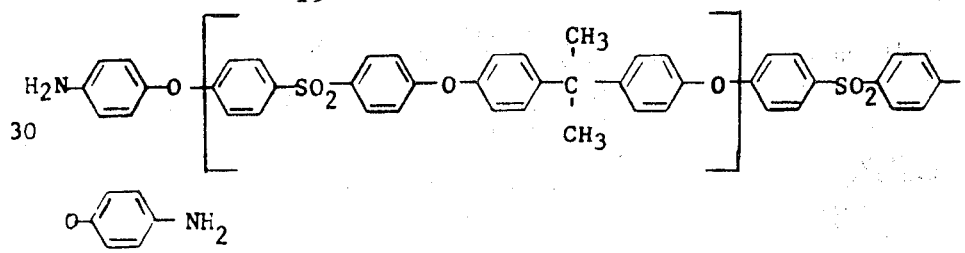

wherein *n* has an average value of about 1.

EXAMPLE 3

Preparation of oligomer diamine from p-aminophenol, hydroquinone and p-dichlorodiphenyl sulfone A 500 ml., 4-necked flask fitted with a thermometer, Dean Stark moisture trap and reflux condenser, nitrogen inlet tube, mechanical stirrer, and addition funnel was charged with 11.01 (0.1 mole) of hydroquinone, 43.0 grams (0.108 moles) of p,p'dichlorodiphenyl sulfone, 10.91 grams (0.10 mole) of p-aminophenol, 24.8 grams (0.108 mole) of anhydrous potassium carbonate and 75 ml. of chlorobenzene. Nitrogen was bubbled through the reaction mixture for 30 minutes and 110 ml. of freshly distilled and deoxygenated sulfolane (tetrahydrothiophene-1,1-dioxide) was added dropwise to the stirred mixture. The reaction mixture was heated to 140°C. with an oil bath. The reaction mixture was then cooled to 25°C. and had a light grey color and a consistency of a slurry. After about 40 minutes the reaction mixture was raised to about 183°C. at which time about 20 ml. of a water-chlorobenzene mixture was collected in the trap. The reaction mixture was then raised to a temperature of about 200° C. over a period of 30 minutes at which time about 7 ml. of water-chlorobenzene had distilled over into the trap. After 15 minutes at 210°C. chlorobenzene was added dropwise (75 ml.) to assist the azeotroping reaction removing the reaction moving the last traces of water. The reaction temperature was kept at 210°C. for an additional 1.5 hours after which it was allowed to cool overnight under nitrogen to room temperature. The next morning a light purple solid remained which partially dissolved in 200 ml. of dimethylformamide. This mixture was filtered to remove sodium chloride and gave a total yield of about 89 per cent of the hydroquinone-oligomer-sulfone ether diamine having the formula shown below:

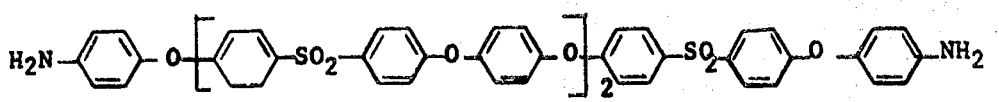

The product was coagulated in isopropanol washed with water again with isopropanol. The melting point was 222°–229°C.

EXAMPLE 4

Preparation of Polyamide-imides

A three liter, three necked round bottom flask equipped with a mechanical stirrer, thermometer and nitrogen inlet tube was charged with 173.00 grams (0.4 mole) of recrystallized sulfone ether diamine prepared as in Example 1 and having a melting point of 191°–192°C. and 900 ml. of anhydrous dimethylacetamide freshly distilled over molecular sieves. This reaction mixture was cooled at −10°C. with a dry ice acetone bath and 84.22 grams (0.4 mole) of distilled trimellitoyl chloride was added in portions at such a rate as to keep the temperature between −10° and −5°C. This operation took approximately 20 minutes during which time the reaction mixture appeared to increase in the viscosity. After maintaining the temperature for 1 hour at 0°C., 60 ml. of anhydrous triethylamine was added dropwise at a rate sufficient to keep the temperature below about +5°C. Reaction was allowed to continue with stirring for about 10 minutes during which time a noticeable increase in viscosity resulted. After 30 minutes the reaction mixture was extremely viscous. An additional 300 ml of dimethylacetamide was added and the mixture stirred at 15°C. for a total of 3 hours timed from the addition of the trimethylamine. Then 100 ml of pyridine and 200 ml of acetic anhydride was added and the mixture was stirred overnight (approximately 12 hours) at room temperature. The product was coagulated in water (the volume of water being about 10 times that of the reaction mixture), slurried in acetone and dried in a vacuum oven at 200°C. A yield of 234 grams (100 per cent) of a polyamide-imide having repeating units represented by the formula below:

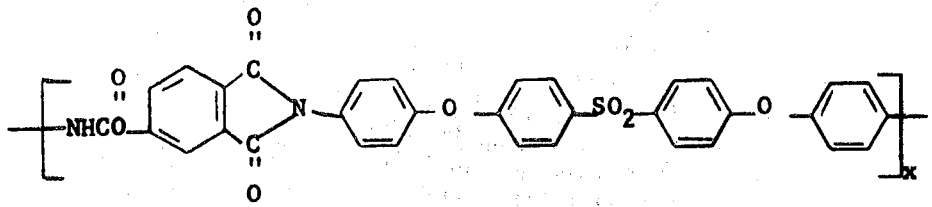

where *x* is as defined previously was obtained as a light yellow solid having a reduced viscosity in dimethylacetamide at 25°C. when measured as a 0.2 per cent solution of 0.97. Sample plaques for physical testing were prepared by compression molding at 350°C. There was no change in reduced viscosity as a result of the compression molding operation. Films of this polyamide-imide were also prepared by solvent castings from dimethylacetamide. The mechanical properties of both the molded plaques and the cast films are shown in Table I below:

TABLE I

| Sulfone ether polyamide-imide mechanical properties | | |
|---|---|---|
| Mechanical Test | Value of molded plaque | Value of cast film |
| $T_g$ | 270°C | 265°C. |
| $T_2$ | 290°C. | — |
| Flow | None at 380°C. | |
| Tensile Modulus | 367,000 psi. | 376,000 psi. |
| Tensile Strength | 12,500 psi. | 11,500 psi. |
| Elongation Break | 13% | 8% |
| Pendulum Impact | 171 ft-lbs/in³ | 78 ft-lbs/in³ |

Environmental stress aging characteristics were determined as follows.

A calculated stress (in psi) was applied to a 1–30 mil thick polymer film approximately ⅛ inch wide and 4 inches long by means of an Instron Tensile Tester. The film was wrapped with an adsorbent cloth and a solvent was applied (to the film and cloth). The time was then noted and again noted when rupture occurs or 10 minutes without rupture achieved. If rupture has not occurred, the film was examined for craze marks and tested for brittleness by the ASTM D 256-56 Pendulum Impact Strength Method. The results of the solvent stress crack resistance evaluation in 3 solvents is shown in Table II below:

TABLE II

| Sulfone ether polyamide-imide solvent stress crack properties | | | |
|---|---|---|---|
| Solvent | Stress | Times | Result |
| Trichloro-ethylene | 4,000 psi | 10 min. | not crazed or brittle |
| Xylene | 4,000 psi | 10 min. | " |
| Acetone | 4,000 psi | 20 sec. | ruptured |

EXAMPLE 5

Preparation of Polyamide-Imide from Sulfone Ether Diamine and Trimellitic Acid Anhydride To a 100 ml flame dried flask with a mechanical stirrer, Dean Stark trap, nitrogen inlet, and thermometer was added 60 ml N-methylpyrrolidinone and 21.63 grams (0.05 mole) 4,4'-bis[oxyphenyleneamine]diphenyl sulfone. The reaction mixture was heated to 45°C. and approximately one-third of 9.61 grams trimellitic acid anhydride was added. This portion dissolved in 20 minutes, and a 2nd portion was added at 48°C. The final portion was added 20 minutes later. In 35 minutes all the acid anhydride dissolved and reacted at the anhydride functional group. About 25 ml of chlorobenzene was added and the reaction mixtures heated to 160° in 1 hour. The first drops of water came over at this time. About 1 hour later 5 ml fresh chlorobenzene was added at 172°C. This procedure was repeated 10 minutes later. About 40 minutes later the temperature was 211°C. and no water was present. Then 0.6 gram of boric acid dried at 160°C. (vacuum) was added. After stirring for 20 hours at 210°, the reaction mixture was diluted with N-methylpyrrolidinone and coagulated in acetone. The reduced viscosity in dimethylacetamide was 0.41.

EXAMPLE 6

Preparation of Polyamide-Imide from Sulfone Ether Diamine oligomer and Trimellitic Acid Anhydride To a 250 ml flame dried flask fitted with a mechanical stirrer, thermometer, nitrogen inlet, and Dean Stark trap was added one-half of 21.63 grams (0.05 mole) 4,-4'-[oxyphenyleneamine]diphenyl sulfone and 60 ml sulfolane. The reaction mixture was vacuum degassed, and then heated to 49°. Then about one-third of 9.61 grams (0.05 mole) trimellitic acid anhydride was added. When this portion dissolved, a 2nd portion was added. In a total of 1 hour, all the trimellitic acid anhydride was dissolved. Then 100 ml of chlorobenzene was added and the mixture heated to 130°, in 30 minutes. The first drop of water was removed at 134° (clear solution). At 150°, one hour later, a precipitate resulted. About 60 ml chlorobenzene and ~8 ml water had distilled. At this time 0.6 gram boric acid, the 2nd half of the diamine, and 100 ml dry ortho-dichlorobenzene were added. Then the mixture was heated to 178° in 1 hour, and to 205° in an additional hour. Most of the solid was now in solution. About five hours later, the temperature was 215°, and 17 ml of solvent had distilled over with traces of water. Eleven hours later the temperature was 230°C. The reaction mixture was fairly viscous. The reaction mixture was coagulated in isopropanol, slurried in acetone, and dried for 16 hours at 200°C. to yield 28 grams of a yellow powder. The reduced viscosity in dimethylacetamide at 25°C. was 0.81. The mechanical properties were identical to the polyamide-imides prepared from trimellitoyl chloride.

CONTROL A

Example 4 was repeated with the exception that 0.4 mole of pyromellitic dianhydride was used in place of trimellitoyl chloride and the dehydration of the amic acids to imides was effected thermally at 300°C. instead of with a chemical dehydrating agent. The resultant polymide having repeating units represented by the formula shown below:

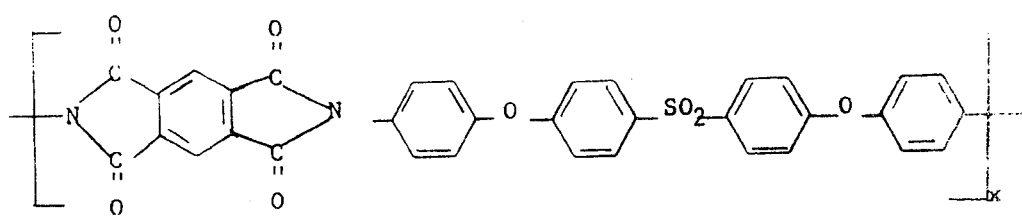

where $x$ is as defined previously, was intractable. An attempt to compression mold this polyimide at 400°C. resulted in decomposition.

EXAMPLE 7

Preparation of Oligomer Diamine from p-Aminophenol, Bis-phenol A and p-Dichlorodiphenyl sulfone.

To a 250 ml round bottom, 3-necked flask equipped with a stirrer, condenser, gas inlet tube, and dropping funnel was added 100 ml of dimethyl sulfoxide. Nitrogen was bubbled through the stirred dimethl sulfoxide for 1 hour. Recrystallized p-aminophenol 8.197 grams (66 millimoles) was charged to the flask followed by 2.628 grams (66 millimoles) of 50.22% aqueous sodium hydroxide solution. Deoxygenated chlorobenzene (100 ml) was next charged to the flask and the temperature increased to 125°C. over a period of 30 minutes. The reaction mixture was cooled to 100°C. and 21.877 grams of chlorine terminated polysulfone oligomer having the formula shown below:

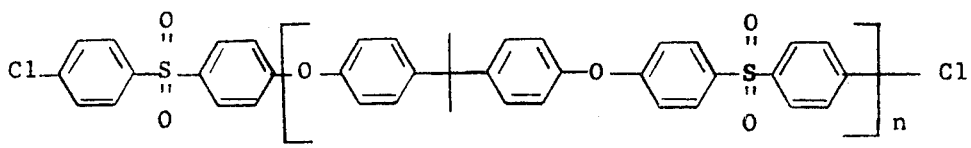

where the average value of $n=1$ and a molecular weight of 729.24 added. The temperature was further increased to 140°C. over a period of 1 hour and 40 minutes and held at this temperature for 4 hours. The contents of the flask was then coagulated in 1500 ml. of water producing an oil. The oil was dissolved in chloroform and the chloroform layer washed with water until the water layer was only lightly colored. This took five 500 ml additions of water. The reddish brown solution was evaporated to 200 ml and the residue coagulated in 2000 ml of isopropanol. A solid white precipitate resulted which was collected by vacuum filtration and washed 3 times with 200 ml portions of isopropanol. After drying in a vacuum overnight a yield of 17.1 grams of diamine was obtained having the formula shown below:

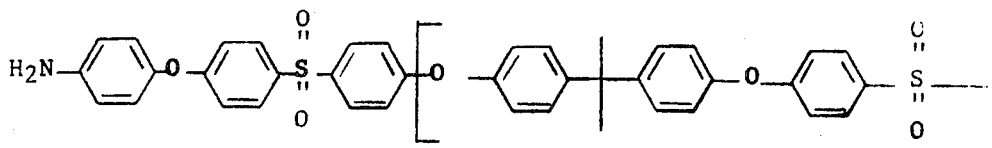

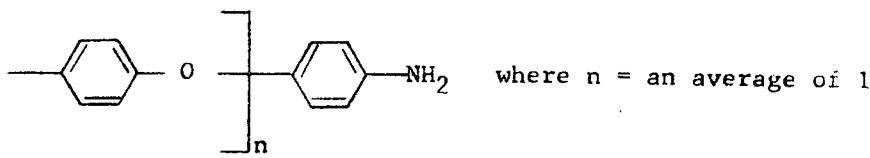 where n = an average of 1

The nuclear magnetic resonance spectrum in trifluoroacetic acid indicated an aromatic to methyl ratio of 4.5 plus or minus 0.2. The n. m. r. of the same solution two days later gave a ratio of 4.6 plus or minus 0.1.

EXAMPLE 8

Example 7 was repeated with the exception that 0.133 mole of sodium p-aminophenolate was condensed with a product prepared from 0.133 mole of sodium biphenolate A and 0.20 mole of dichlorodiphenyl sulfone. Titration of the resulting amine in a perchloric acid-glacial acetic acid mixture (0.01 molar) indicated an equivalent weight of 828.2.

EXAMPLE 9

Example 7 was repeated with the exception that 0.10 mole of sodium p-aminophenolate, was condensed with 0.15 mole of sodium bisphenolate A and 0.20 mole of dichlorodiphenyl sulfone. Titration of the diamine obtained showed an equivalent weight of 1,069.

EXAMPLE 10

A 4-necked one liter flask equipped with a mechanical stirrer, thermometer, nitrogen inlet tube and Dean Stark water trap was charged with 114.88 grams (0.40 mole) of dichlorodiphenyl sulfone, 45.62 grams (0.20 mole) of bisphenol A, and 200 ml of dimethyl sulfoxide. Solution was vacuum degassed and 15.836 grams (0.20 mole) of 50.52% aqueous sodium hydroxide solution added at room temperature. The mixture was heated at 55°C. for 15 minutes and 400 ml of degassed chlorobenzene was added. Stirring was continued for 2 hours at 120°–140°C. until no further water collected in a water trap. The chlorobenzene was removed by heating the mixture to 160°C. and distilling. The mixture was maintained at 160°C. for an additional 4 hours. There was then added 33.65 grams (0.40 mole) of recrystallized p-aminophenol, 46.60 grams (0.60 mole) of 50.52% of aqueous sodium hydroxide solution and 300 ml of deoxygenated chlorobenzene. The mixture was heated for 2.5 hours to remove water and heating continued at 160°–165°C. for 2 hours. The mixture was filtered free of salt and the filtrate coagulated in isopropanol yielding 146.5 grams (84%) of diamine having an equivalent weight of 509.9. This diamine had the formula below:

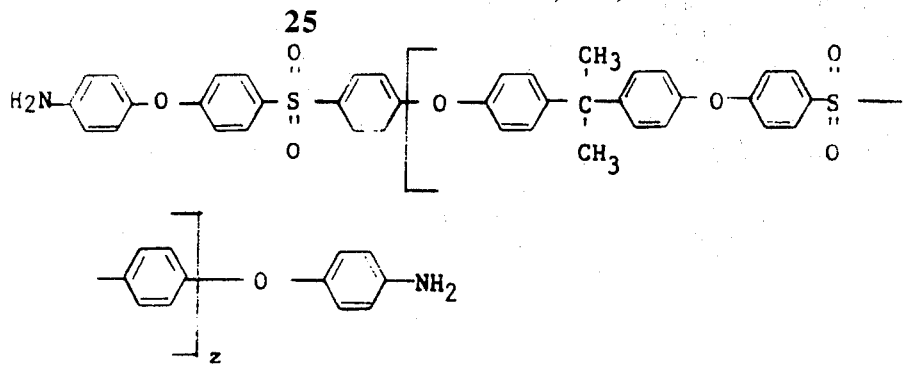

where $z$ has an average value of 1.33.

EXAMPLE 11

A 4-necked one liter flask equipped with a mechanical stirrer, thermometer, nitrogen inlet tube and Dean Stark water trap was charged with 28.72 grams (0.1 mole) of dichlorodiphenyl sulfone, 45.62 grams (0.2 mole) of bisphenol A, 21.82 grams (0.2 mole) of p-aminophenol in 200 ml of dimethyl sulfoxide and 100 ml of toluene. The solution was vacuum degassed and 47.51 grams (0.6 mole) of 50.52% aqueous sodium hydroxide solution added. The mixture was heated to remove water at which point the reaction mixture had a temperature of 124°C. Then 57.4 grams (0.2 mole) of dichlorodiphenyl sulfone was added. Toluene was distilled off raising the pot temperature to 140°C. at which temperature the reaction mixture was kept overnight. Coagulation of the mixture is isopropanol yielded 912 grams of diamine which by titration had an equivalent weight of 1127.8 and had the formula shown below:

bisphenol A, 687.5 grams (6.38 moles) of p-aminophenol, 4.2 liters of dimethyl sulfoxide and 2.5 liters of toluene. After purging with nitrogen, 1003.8 grams (12.62 moles) of a 50.2% aqueous solution of sodium hydroxide was added and pot temperature raised to 110°–120°C. Water was removed as a toluene azeotrope and the remaining toluene distilled off by raising the pot temperature until it reached 160°C. At this point the reaction mixture was cooled at 110°C. and 1807.5 grams (6.28 moles) of para-para'-dichlorodiphenyl sulfone added as a solid. The reaction flask was reheated to 160°C. for 1 hour and then cooled to 150°C. at which point a solution of sodium p-aminophenolate, prepared by dehydrating a mixture of 10.9 grams (0.1 mole) of p-aminophenol, 8.0 grams (0.1 mole) of a 50% aqueous sodium hydroxide solution, 30 ml of dimethyl sulfoxide and 20 ml of toluene, was added.

The reaction mixture was cooled to room temperature, the solution filtered to remove sodium chloride

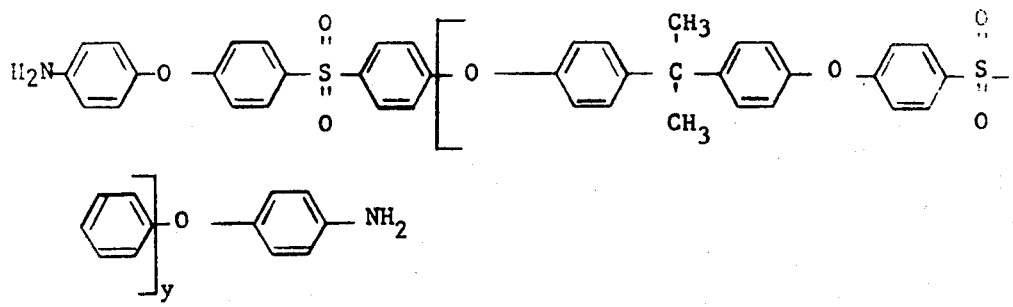

wherein $y$ has an average value of about 4.

EXAMPLE 12

A 12 liter flask equipped with a mechanical stirrer, thermometer, condenser, gas inlet tube and an addition funnel was charged with 716.5 grams (3.14 moles) of and coagulated in a blender from 2% sodium hydroxide aqueous solution containing 1% sodium sulfite. The precipitated diamine was washed with a hot 1% aqueous solution of sodium sulfite and methanol and dried in a vacuum oven at 80°C.

The yield of diamine which had the formula shown below:

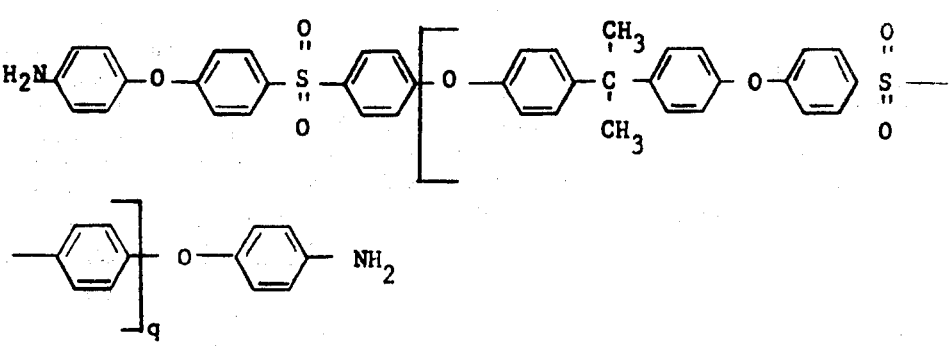

where $q$ has an average value of about 1.2 was 2,152 grams (79%) and the equivalent weight was 474 grams.

Analysis of this oligomer diamine by liquid-liquid chromatography and gel permeation chromatography indicated that it was a mixture of diamines having the formula shown above where $n=0, 1, 2, 3, 4$, and above. The weight fraction distributions were found to be as follows:

| n | Wt. % of Fraction |
|---|---|
| 0 | 21.1 |
| 1 | 39.4 |
| 2 | 22.0 |
| 3, 4 and above | 17.5 |

This distribution is typical of linear condensation reactions.

EXAMPLE 13

Using the procedure described in Example 4 for the preparation of polyamide-imides, the diamine prepared in Example 12 was converted to a high molecular weight polyamide-imide having a reduced viscosity of 0.55.

EXAMPLE 14

Preparation of 4,4'-bis(p-oxyphenyleneamine)diphenyl sulfone

A 5-liter 4-necked flask equipped with a mechanical stirrer, nitrogen inlet tube, thermometer, addition funnel, and Dean Stark water trap was charged with 1000 ml. of dimethyl sulfoxide and degassed under a vacuum of 63 mm. of mercury for 25 minutes at 250°C. Then 458 grams (4.2 moles) of crude practical grade p-aminophenol was added. The reaction mixture was warmed to 58°C. with nitrogen sparging and 2000 ml. of toluene and 574.4 grams (2.0 moles) of dichlorodiphenyl sulfone was added. The mixture was heated to 145°C. for 3.5 hours. The product 4,4'-bis(oxyphenyleneamine)diphenyl sulfone had an equivalent weight of 218.7±0.2.

EXAMPLE 15

Preparation of Oligomer Diamine

A 5 liter, 3-necked flask equipped with a mechanical stirrer, thermometer, condenser, Barrett tube and nitrogen inlet tube was charged with 286.6 g. (1.257 moles) of bisphenol A, 275.0 g. (2.52 moles) of p-aminophenol, 1.7 liters of dimethyl sulfoxide, 1.0 liter of toluene and 40.15 g. (5.034 moles) of a 50.21% aqueous solution of sodium hydroxide. The mixture was heated to reflux under nitrogen until all of the water was removed as a toluene-water azeotrope. Then, 723 g. (2.52 moles) of dichlorodiphenyl sulfone was added to the flask and the pot temperature maintained at 160°–165°C. for one hour with stirring. At this point a mixture of 11.2 g. (0.105 moles) of p-aminophenol, 35 ml of dimethyl sulfoxide, 25 ml. of toluene and 8.0 g. of 50.2% aqueous sodium hydroxide solution, which had been previously treated to remove water by the procedure described above in the first paragraph of the instant examples was added and mixture stirred for 1 hour at 140°–155°C. The product oligomer diamine was recovered by pouring the reaction mixture into an excess of water containing 2% sodium hydroxide and 1% sodium sulfite with stirring, filtering, washing on the filter with water and drying. A yield of oligomer diamine of 929 g. (84.5%) was obtained having an equivalent weight of 474 (theoretical 437) as determined by amine end group titration with an perchloric acid-acetic acid mixture described above which corresponds to a molecular weight of 948.

The formula of this oligomer diamine is

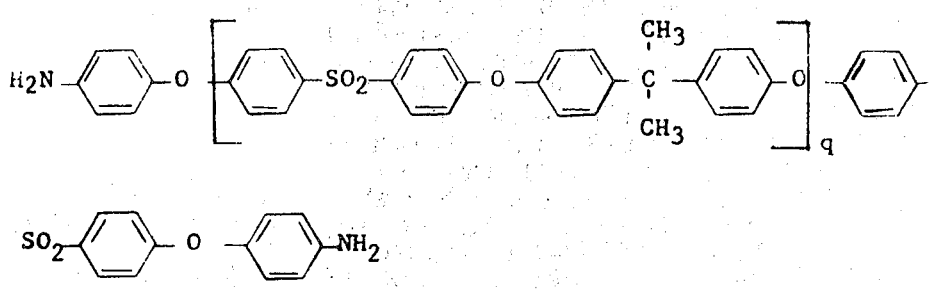
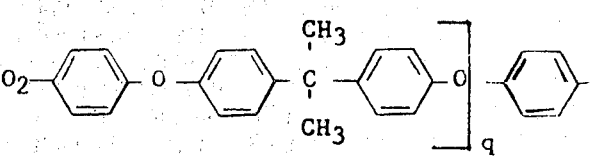

wherein $q$ has an average value of 1.2.

EXAMPLE 16

Preparation of Oligomer Diamine

Example 15 was repeated with the exception that it was scaled up by a factor of 3. A yield of 2.700 g. (84%) of oligomer diamine was obtained having an equivalent weight of 445 corresponding to a molecular weight of 890. In the formula representing this oligomer in Example 15, $q$ has an average value of 1.0.

EXAMPLE 17

Preparation of Polyamide-Imide from Oligomer Diamine

A 5 liter round bottom flask equipped with a mechanical stirrer, thermometer, condenser, gas inlet tube and addition funnel was charged with 746 g. (0.785 moles) of the oligomer diamine prepared in Example 16 in 3 liters of dimethylacetamide under argon together with 1659 (0.785 moles) of trimellitoyl chloride. The resulting solution was stirred for 0.5 hours at 10°C., and then (0.785 moles) of triethylamine added to the mixture in order to scavenge the HCl generated. The polymer which formed was in an amic acid form, that is, containing both amide and carboxyl groups in its backbone. This was converted to an amide-imide polymer by the addition of 79.4 g. (0.785 moles) of acetic anhydride and stirring the reaction mixture overnight. The polyamide-imide was recovered from solution by coagulatin from an excess of water followed by filtration, water washing and drying.

The resultant polyamide-imide had repeating units represented by formula:

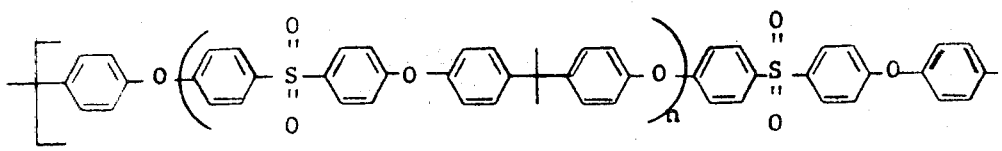

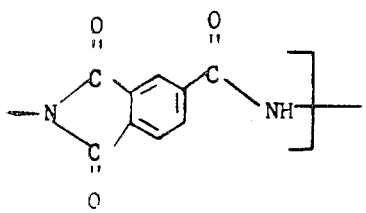

wherein *n* has an average value of about 1. This polymer had a reduced viscosity measured as a 0.2% solution in dimethylacetamide at 25°C. was 0.50 and could be extruded through a vented extruder and ram injection molded. Plaques of this polymer obtained by compression molding at 1500 psi. and 350°C. showed the following physical properties:

| | |
|---|---|
| $T_g$ | 215°C. |
| $T_2$ | 245°C. |
| Flow Temperature | 320°C. |
| Tensile Strength (ASTM D638-56) | 12,200 psi. |
| Tensile Modulus (ASTM D638-56) | 279,000 psi. |
| Elongation at break (ASTM D638-56) | 12% |
| Pendulum Impact Strength (ASTM D-256-56) | 120 ft. lbs./in. |

EXAMPLE 18

Preparation of Polyamide-Imide

Using the procedure described in Example 17 with the oligomer diamine prepared in Example 16 having a molecular weight of 890, a solid polyamide-imide was prepared having the repeating units represented by the formula:

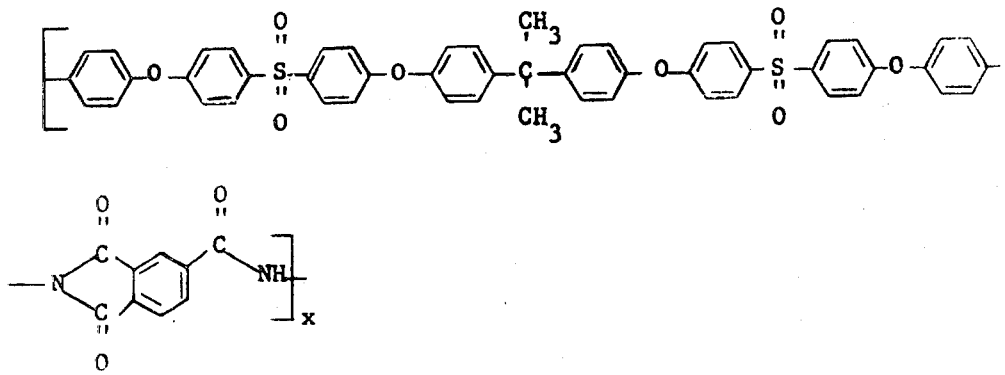

wherein *x* is as defined previously. This polymer was processed in a single vent, single screw extruder at a stock temperature of 310°-340°C. Clear, gel-free strands with good appearance were extruded. Production rates of over 1000 grams/hour were achieved using a 24/1 L/D one inch screw. The reduced viscosity of the polymer increased slightly from 0.50 to 0.56. during the extrusion process indicating that no degradation occurs.

After processing this polymer showed a melt flow range of $$\frac{MF_2}{MF_1} = 1.0 - 1.4$$

where $MF_2$ was measured after 0.5 hours at 350°C.

The melt index for extruded polymer which then showed a reduced viscosity of 0.55 was 1.3 g/10 min. (1P) and 32 g./10 min. (10P). All melt indices were measured in conformity with ASTM-1238 61T.

Tensile and heat deflection bar specimens were readily obtained from this polymer using a Van Dorn injection molding machine. The heat deflection temperature (ASTM 648-56) was 197°C. The tensile strength (ASTM D-638-605) was 8,040 psi and the modulus of elasticity (ASTM D-638-607) was 397,000 psi.

EXAMPLE 19

Preparation of Polyamide-Imide from ether sulfone Oligomer diamine and trimellitoyl chloride One mole of the ether sulfone oligomer diamine prepared in Example 16 from one mole of sodium bisphenolate A, 2 moles of sodium p-aminophenalate and 2 moles of dichlorodiphenylsulfone having an average molecular weight of 910 was charged to a 5 liter resin flask with one mole of trimellitoyl chloride in 3 liters of dimethylacetamide. After stirring the mixture for one hour under an inert atmosphere at ambient temperatures, 1.1 moles of triethylamine was added and stirring continued for 2 hours. The very viscous solution of polyamic acid which formed was converted to the corresponding amide-imide by the addition of one mole of acetic anhydride. The polymer was coagulated from the reaction mixture in water with stirring and dried in vacuum. A 96% yield of polyamide imide having a reduced viscosity in dimethyl acetimide at 25°C. of 0.60 was obtained having the following repeating units:

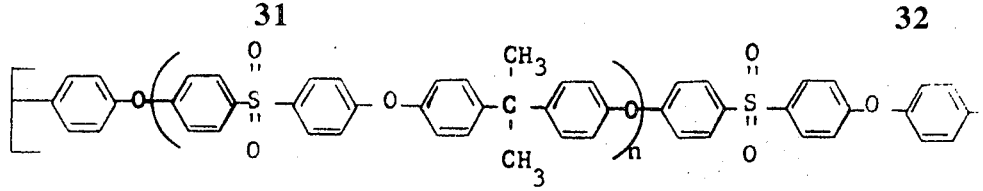

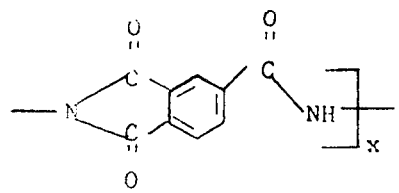

wherein $x$ is as defined previously and $n$ has an average of 1.

Plaques from this polyamide-imide were compression molded at 350°C. and 1500 psi. The material was extruded at a stock temperature of 350°C. and also ram injection molded at a stock temperature of 360°–380°C.

The compression molded plaques were clear and free of voids. These plaques were then used to obtain the following physical properties:

| | |
|---|---|
| $T_g$ | ca. 220°C. |
| Tensile Modulus | 288,000 psi. |
| Tensile Strength | 10,700 psi. |
| Yield | 7.0% |
| Elongation at break | 10% |
| Pendulum impact strength | 146 ft. lb/in.³ |
| Dielectric Strength (10 mil plaque) | 1,168 volts/mil. |
| Volume Resistivity | $5.8 \times 10^{16}$ ohm-cm. |
| Dielectric constant 60 cps. | 3.9 |
| 1 Kc | 3.9 |
| Dissipation Factor 60 cps. | 0.0054 |
| 1 Kc | 0.0045 |
| Environmental stress aging characteristics | |
| Trichloroethylene | 1,000 psi; 10 min; non-crazed, non-brittle, |
| Xylene | 1,000 psi; 10 min; non-crazed, non-brittle, |
| Ethyl acetate | 2,000 psi; 10 min; non-crazed, non-brittle. |

EXAMPLE 20

Preparation of Polyamide-Imide from 4,4′-bis-(p-oxyphenyleneamine)diphenyl sulfone and Trimellitoyl chloride A 250 ml. flame-dried flask fitted with a mechanical stirrer thermometer, nitrogen inlet tube and condenser was charged with 34.6 grams (0.08 moles) of 4,4′-bis(p-oxyphenyleneamine)diphenyl sulfone and 100 ml of distilled dimethylacetamide. The reaction mixture was cooled to −10°C. and 17.754 grams (0.084 moles) of distilled trimellitoyl chloride was added in small portions at such a rate that the temperature stayed below 0°C. After stirring at 0°C. at 3 hours, the reaction mixture was cooled to −10°C. and 11.6 ml. of triethylamine was added. The viscosity of the reaction mixture increased significantly and triethylamine hydrochloride precipitated. 1 Hour later 10 ml. of acetic anhydride and 10 ml. of pyridine were added and the mixture stirred overnight at room temperature. After filtration of the reaction mixture the polyamide imide was coagulated in an excess of acetone, filtered and dried at 100° overnight in vacuum. The yield of polyamide-imide having repeating units represented by the formula below:

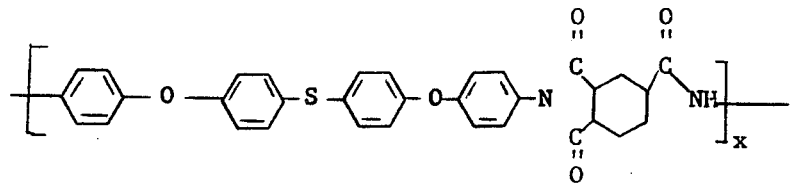

wherein $x$ is as defined previously, was 47.9 grams and the reduced viscosity was 0.50.

Melt flow determinations were made by weighing in grams the amount of polyamide-imide which at a temperature of 350°C. and under a pressure of 44 psi. flowed through an orifice having a diameter of 0.0825 inches and a length of 0.315 inches over a 10 minute period. This value was recorded as $MF_1$. A second set of melt flow measurements ($MF_2$) was made by allowing the polyamide-imide to remain at a temperature of 350°C. for 0.5 hours before running the melt flow test. The ratio of $MF_2$ divided by $MF_1$ is an indication of the thermal stability of the polymer, the ideal value being 1.0.

Melt index measurements were performed as described in ASTM D-1238-61.

Reduced viscosity was determined by weighing a 0.2 gm. sample of polyamide-imide into a 100 ml. volumetric flask and adding dimethylacetamide thereto. After solution was complete, additional solvent was added to exactly the fiducial line while the flask was maintained in a 25°C. constant temperature bath. The solution was thereafter filtered through a sintered glass funnel and the viscosity of a sample determined in a viscometer tube at 25°C. Reduced viscosity values were computed by using the equation:

$$RV = \frac{t_s - t_o}{ct_o}$$

wherein:
$t_o$ is the efflux time for the solvent
$t_s$ is the efflux time for the polyamide-imide solution.
$ct_o$ is the concentration of the polyamide-imide solution in terms of grams of polyamide-imide per 100 ml. of solution.

Tensile impact strengths were determined in conformity with ASTM D-256-56. Glass transition temperature ($T_g$) also referred to as second order phase transition temperatures refer to the inflection temperature found by plotting the resilience, (recovery from 1% elongation) of a film, ranging in thickness from 3 to 15 mils., against the temperature. A detailed explanation for determining resilience and inflection point is to be found in an article by A. Brown (Textile Research Journal) Vol. 25, 1955 at page 891.

$T_2$ is the temperature at which the tensile modulus (measured in accordance with ASTM D-256-56) reaches 100 psi.

EXAMPLE 21

A polyphenylene ether amine was prepared as follows:

To a 2 liter, 4-neck flask equipped with a Dean Stark trap, condenser nitrogen inlet tube and thermometer was added 110.0 grams (1.008 mole) p-aminophenol and 500 ml. of toluene. The system was purged with nitrogen and 400 ml. of dimethylsulfoxide added. The system was purged again with nitrogen and 81.5 grams (1.05 mole) of 49.15% aqueous sodium hydroxide added. The solution was heated to 110°–120°C. and water removed via the toluene/water azeotrope. After complete dehydration (approximately 4–5 hours), toluene was removed until the pot temperature reached 135°C.

A concentrated solution of Aroclor 5460 (274 grams) (0.5 mole) in 250 ml. of hot toluene was added via an addition funnel. The remaining toluene was then distilled off. The pot was heated to 160°C. and maintained 1 hour before cooling to room temperature.

At room temperature, the reaction mixture was vacuum filtered to remove sodium chloride and coagulated. Coagulation was accomplished by pouring the filtrate slowly into distilled water (1 to 10 of water) contained in a 3 liter blender and stirred at a high speed. Vacuum filtration through a fritted glass funnel afforded a dark colored diamine. The diamine was washed further with hot distilled water, then dried at 60°C. under vacuum.

The dried amine (76% yield) was dark brown in color and had a titrated amine equivalent of 365. The chlorine content by elemental analysis was 36.2%. The mass spectrum indicated the product was composed of 9 amines:

$C_{18}H_7Cl_6(OC_6H_4NH_2)$
$C_{18}H_7Cl_7(OC_6H_4NH_2)$
$C_{18}H_5Cl_8(OC_6H_4NH_2)$
$C_{18}H_6Cl_6(OC_6H_4NH_2)_2$
$C_{18}H_5Cl_7(OC_6H_4NH_2)_2$
$C_{18}H_4Cl_8(OC_6H_4NH_2)_2$
$C_{18}H_5Cl_6(OC_6H_4NH_2)_3$
$C_{18}H_4Cl_7(OC_6H_4NH_2)_3$
$C_{18}H_3Cl_8(OC_6H_4NH_2)_3$

EXAMPLE 22

To a 2 liter, 4-neck flask equipped with a Dean Stark trap, condenser, nitrogen inlet tube and thermometer was added 60.02 grams (0.55 mole) of p-aminophenol, 57.08 grams (0.25 mole) of Bisphenol A and 500 ml. of toluene. The system was purged with nitrogen and 450 ml. of dimethylsulfoxide added. The system was purged again with nitrogen and 84.64 grams (1.04 mole) of 49.15% aqueous sodium hydroxide added. The solution was heated to 110°–120°C. and water removed via the toluene/water azeotrope. After complete dehydration (approximately 4–5 hours), toluene was removed until the pot temperature reached 135°C.

A concentrated solution of Aroclor 5460 (274 grams) (0.5 mole) in 250 ml. of hot toluene was added via an addition funnel. The remaining toluene was then distilled off. The pot was heated to 160°–165°C. and maintained 2 hours, before cooling to room temperature.

At room temperature, the reaction mixture was vacuum filtered to remove sodium chloride and coagulated. Coagulation was accomplished by pouring the filtrate slowly into distilled water (1 to 10 of water) containing 2% sodium hydroxide (1% sodium sulfite) contained in a 3 liter blender and stirred at a high speed. Vacuum filtration through a fritted glass funnel afforded a light colored diamine. The diamine was washed further with a hot 1% sodium sulfite solution and ispropanol, then dried at 85°C. under vacuum.

The dried diamine was tan in color and had a titrated amine equivalent of 696.

EXAMPLE 23

To a 2 liter, 4-neck flask equipped with a Dean Stark trap, condenser, nitrogen inlet tube and thermometer was added 121.1 grams (1.11 moles) p-aminophenol, 114.15 grams (0.5 mole) bisphenol A, 400 ml. toluene and 500 ml. dimethylsulfoxide. The solution was saturated with nitrogen and 171.32 grams (2.105 moles) of 49.15% aqueous sodium hydroxide added. The pot temperature was increased to 110°–120°C. and water removed via the toluene/water azeotrope. After complete dehydration (approximately 4–5 hours), the remaining toluene was removed until the pot temperature reached 150°–160°C.

The heating was discontinued and the reaction cooled to 130°C. Solid dichlorodiphenylsulfone (258.3 grams, 0.9 moles) was added, followed by hexachlorobenzene 28.5 grams, 0.1 mole). After completing the addition of hexachlorobenzene, the pot was heated to 160°–165°C. and maintained 1 hour before cooling to room temperature.

At room temperature, the reaction mixture was vacuum filtered to remove sodium chloride and coagulated. Coagulation was accomplished by pouring the filtrate slowly into distilled water (1 to 10 of water) containing 2% sodium hydroxide/1% sodium sulfite contained in a 3 liter blender and stirred at a high speed. Vacuum filtration through a fritted glass funnel afforded a light colored diamine. The diamine was washed further with a hot 1% sodium sulfite solution and isopropanol, then dried at 85°C. under vacuum.

The dried diamine was tan in color and had a titrated amine equivalent of 429.

EXAMPLE 24

To a 3 liter, 3-neck flask equipped with a Barrett tube, condenser, nitrogen inlet tube and thermometer was added 115.0 grams (1.05 mole) of p-aminophenol, 114 grams (0.5 mole) of Bisphenol A and 800 ml. of toluene. The system was purged with nitrogen and 800 ml. of dimethylsulfoxide added. The system was purged again with nitrogen and 164 grams (2.03 mole) of 49.15% aqueous sodium hydroxide added. The solution was heated to 105°–120°C. and water removed via the toluene/water azeotrope. After complete dehydration, toluene was removed until the pot temperature reached 135°C.

A concentrated solution of Aroclor 1268 (453 grams, 1.0 mole) in 500 ml. of hot toluene was added via an addition funnel. The remaining toluene was then distilled off. The pot was heated to 160°–175°C. and maintained 2 hours, before cooling to room temperature.

At room temperature, the reaction mixture was vacuum filtered to remove sodium chloride and coagulated. Coagulation was accomplished by pouring the filtrate slowly into agitated water (1/10 ratio) containing 2% sodium hydroxide/1% sodium sulfite. Filtration afforded a light colored diamine. The diamine was washed further with a hot 1% sodium sulfite solution, then dried at 85°C. under vacuum.

The dried diamine was ten in color and had a titrated amine equivalent of 650. The product melted in the range of 125°–160°C.

EXAMPLE 25

1,3-bis(p-Oxyphenyleneamine)tetrachlorobenzene (Hexachlorobenzene etherdiamine)

Into a 500 ml 4-necked flask equipped with stirrer, and a thermometer, and reflux condenser inlet was charged while under nitrogen, 200 ml toluene, 75 ml DMSO and 21.83 grams (0.2 moles) of p-aminophenol. After purging with nitrogen, 16.05 grams (0.20 moles) of a 49.6% solution of sodium hydroxide was added and the pot temperature brought to 110°–120°C. The water was removed from the toluene azeotrope using a Barrett tube, after which the toluene was distilled off until the pot temperature reached 130°C. At this point, 28.5 grams (0.1 mole) of hexachlorobenzene was added as a solution in 150 mi of toluene. The pot was heated to 160°C. for 3.5 hours and then cooled.

At room temperature, the solution was filtered to remove sodium chloride and coagulated in a blender from 1% sodium hydroxide solution containing 1% sodium sulfite. The precipitated diamine was washed with a hot 1% solution of sodium sulfite and dried in a vacuum oven at 80°C.

The yield of diamine was 36.2 grams (97%) and the equivalent weight was 228 grams.

This oligomer diamine has the formula shown below:

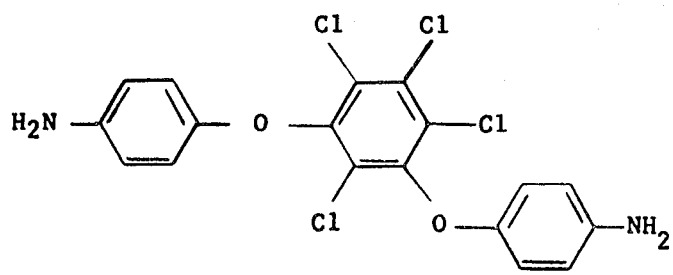

EXAMPLE 26

1,3-bis(p-Oxyphenyleneamine)tetrachlorobenzene

In a 500 ml 4-necked flask equipped with stirrer, thermometer, reflux condenser and nitrogen inlet were combined under nitrogen 100 ml toluene, 100 ml dimethylsulfoxide, 28.5 grams (.1 mole) hexachlorobenzene, 21.83 grams (.2 moles) p-aminophenol and 49.0 grams (.3 moles) $K_2CO_3$. 1½ $H_2O$). After azeotroping off the water, the internal temperature was increased to 145°C. for one hour and then to 160°–165°C. for 2 hours. Toluene was then distilled off until the internal temperature reached 172°C.

After cooling to room temperature, the contents of the flask were filtered, washed with small amounts of dimethylsulfoxide, and coagulated from water. After washing to neutrality and drying, titration yielded amine equivalent of 256 (theory 215).

EXAMPLE 27

Preparation of Oligomer Diamine from p-Aminophenol, bisphenol A, hexachlorobenzene and p-Dichlorodiphenyl Sulfone Into a 3 liter flask was charged 171.225 grams (0.75 moles) of bisphenol A, 165.88 grams (1.52 moles) of p-aminophenol, 700 ml. of dimethyl sulfoxide and 600 ml. of toluene. After purging with nitrogen, 244.96 grams (3.01 moles) of 49.15% sodium hydroxide solution was added and the pot temperature brought to 110°–120°C. The water was removed from the toluene azeotrope using a Barrett tube, after which the toluene was distilled off until the pot temperature reached 145°C. At this point, 215.38 grams (0.75 moles) of dichlorodiphenyl was added as a solid. The pot was reheated to 160°C. for one hour and then cooled to 110°C. At 110°C., a solution of 213.83 grams (0.75 moles) of hexachlorobenzene dissolved in 600 ml. of hot toluene was added. The pot was again heated to 150°–160°C. for one hour and finally cooled to room temperature.

At room temperature, the solution was filtered to remove sodium chloride and coagulated in a blender from 0.5% sodium hydroxide solution containing 0.5% sodium sulfite. The precipitated diamine was washed with a hot 1% solution of sodium sulfite and dried in a vacuum oven at 80°C.

The yield of diamine was 291.8 grams (73.9%) and the equivalent weight was 452 grams.

EXAMPLE 28

Preparation of Polyamide-imides

A 250 ml., three-neck round bottom flask equipped with a mechanical stirrer, thermometer, and nitrogen inlet tube was charged with 16 grams (0.70 equiv.) of 1,3-bis(P-oxyphenyleneamine)tetrachlorobenzene) as in Example 25 and 48 ml. of anhydrous dimethylacetamide. The reaction mixture was cooled to <10°C. with an ice bath and 7.42 grams (0.0352 mole) of distilled trimellitoyl chloride was added at such a rate as to keep the temperature around 10°C. After maintaining the temperature for one hour at 10°C., 7.35 grams (.0726 mole) of anhydrous triethylamine was added dropwise at a rate sufficient to keep the temperature below 20°C. Reaction was allowed to continue with stirring for about ten minutes during which time a noticeable increase in viscosity resulted. After thirty minutes the reaction mixture was extremely viscous. Then, 8 grams (.0784 moles) of acetic anhydride) was added and the mixture was stirred overnight at room temperature.

The product was coagulated in water (the volume of water being about ten times that of the reaction mixture), slurried in acetone and dried in a vacuum oven at 160°C. A yield of 19.8 grams (96%) of a polyamide-imide having repeating units represented by the formula below:

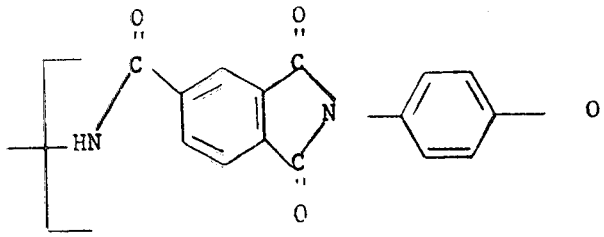

wherein X denotes the degree of polymerization and has a value high enough so as to denote a normally solid polymer. The polymer had a reduced viscosity 0.49 dl/gram when measured as a 0.2 percent solution in dimethylacetamide.

Sample plaques were prepared by compression molding at 350°C. The glass transition temperature (Tg) of the polymer was 245°C.

EXAMPLE 29

1,3-bis(p-Oxyphenyleneamine)tetrachlorobenzene Polyamide-imide

A 250 ml. three-neck flask fitted with a mechanical stirrer, thermometer and nitrogen inlet tube was charged with 10.0 grams (0.044 equiv) of 1,3-bis(p-Oxyphenyleneamine)tetrachlorobenzene and 60 ml. of distilled dimethylacetamide. The reaction mixture was cooled to 10°C. and 9.28 grams (0.044 moles) of distilled trimellitoyl chloride was added at such a rate that the temperature stayed below 15°C. After stirring at 0°–10°C. for one hour, 9.1 grams (0.09 moles) of triethylamine was added. After stirring for one hour further, the remaining 10.0 grams (0.044 equiv.) of 1,3-bis(p-Oxyphenyleneamine) tetrachlorobenzene was added in one portion. The viscosity of the reaction mixture increased significantly and another ~120 ml. of dimethylacetamide was required. Three hours later, 10 grams (.098 moles) of acetic anhydride was added and stirring continued overnight.

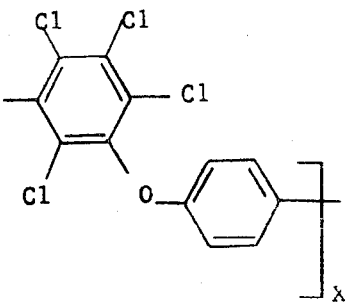

The polyamide-imide was recovered by coagulation from an excess of water followed by filtration, water washing and drying. This polymer had a reduced viscosity of 0.488 dl/gram measured as a 0.2% solution in dimethylacetamide.

Although the invention has been described in its preferred forms with a certain degree of particularity, it is understood that the present disclosure of the preferred forms has been made only by way of example and that numerous changes may be resorted to without departing from the spirit and the scope of the invention.

What is claimed is:
1. An amine having the formula:

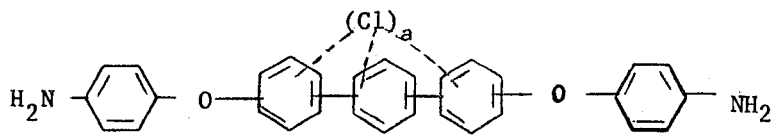

wherein $a$ is an integer having values of 6 to 8.
2. Amine claimed in claim 1 wherein $a$ is 6.
3. Amine claimed in claim 1 wherein $a$ is 7.
4. Amine claimed in claim 1 wherein $a$ is 8.

* * * * *